United States Patent [19]
Tanaka et al.

[11] Patent Number: 5,095,530
[45] Date of Patent: Mar. 10, 1992

[54] RADIO TELEPHONE SYSTEM SWITCHING CONTROL CAPABILITY OF CONTROL CHANNELS

[75] Inventors: Shoji Tanaka; Hirofumi Shiotsuki; Eiki Katsuoka, all of Tokyo, Japan

[73] Assignee: NEC Corporation, Tokyo, Japan

[21] Appl. No.: 421,902

[22] Filed: Oct. 16, 1989

[30] Foreign Application Priority Data

Oct. 14, 1988 [JP] Japan .................. 63-256938

[51] Int. Cl.⁵ .............................. H04B 7/00
[52] U.S. Cl. ...................... 455/33; 455/56; 455/62; 455/68
[58] Field of Search ............ 455/33, 34, 54, 63, 455/67, 68, 56; 379/60, 63

[56] References Cited

U.S. PATENT DOCUMENTS

| | | | |
|---|---|---|---|
| 4,750,198 | 6/1988 | Harper | 455/33 |
| 4,799,253 | 1/1989 | Stern et al. | 455/33 |
| 4,905,301 | 2/1990 | Krolopp et al. | 455/34 |

*Primary Examiner*—Curtis Kuntz
*Assistant Examiner*—Edward Urban
*Attorney, Agent, or Firm*—Sughrue, Mion, Zinn, Macpeak & Seas

[57] ABSTRACT

A radio telephone switching control system having control channels which transmit/receive control data between a plurality of movable terminals and a radio base station. The control channels include a mono-functional channel for access which is dedicated to access during data transmission/receiving by calling from the terminals. The control channel also includes a bi-functional channel for paging and access usable as a channel for paging one of the terminals as well as for access. The system contains a base station with a fault detector. Only one kind of control channel information is broadcast in the same service zone. All of the movable stations existing in same service zone scan the first or second range to decide the channel for access or paging according to the received control channel information. The system also sets the mono-functional channel for access and the bi-functional channel for paging and access, when a fault is not detected. Once a fault is detected, the second range is separated from the first range, whereby the mono-functional channel for paging is used only to transmit data for paging from the base station and the mono-functional channel for access is used to transmit/receive data related to actions other than paging to the terminals.

3 Claims, 6 Drawing Sheets

RADIO TELEPHONE SYSTEM SWITCHING CONTROL CAPABILITY OF CONTROL CHANNELS

BACKGROUND OF THE INVENTION

1. Field of the Invention

This invention relates to a radio telephone system switching control capability of control channels such as a land mobile telephone system of cellular type.

2. Description of the Prior Art

There is known a land mobile telephone system wherein calls are placed from a mobile station such as an automobile via a base station which conducts radio relays. This is quite different from ordinary telephone sets which are fixed in a public telephone box or at an office and wired to an exchange station. As the land mobile telephone system can be used to communicate over the telephone from a moving automobile with an opposite party or page the party who is moving in an automobile, the system has gained popularity among busy business persons and is highly evaluated.

The land mobile telephone system comprises an automobile telephone network and an ordinary telephone circuit network which are organically combined. The system is currently operated by a cellular method. In the method, a certain zone is defined as a cell, and these cells are arranged without interstices therebetween. A radio base station is installed in each of the zones so that automobiles running in the zone can constantly communicate by radio with the base station. Radio communication is generally conducted with ca. 800 megahertz, and the base stations are connected by wire with an upstream mobile telephone switching office to form a land mobile telephone network.

Figure 1:
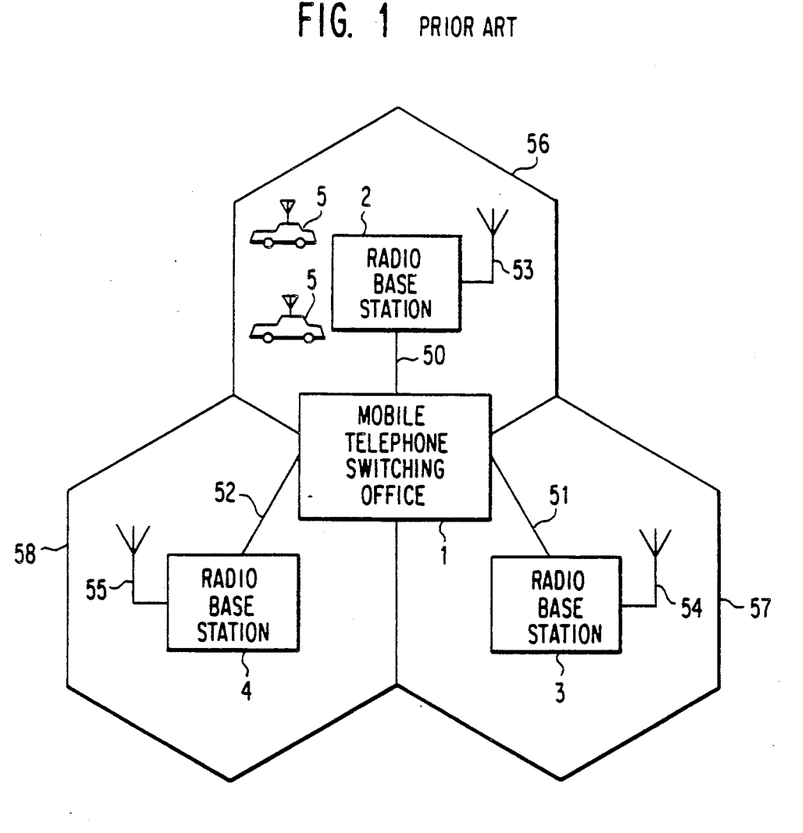
FIG. 1 is a schematic view to show the outline of the cellular type land mobile telephone system.

FIG. 1 shows an example of land mobile telephone system by the cellular method.

Communication between two mobile terminals 5 or between one mobile terminal 5 and a fixed telephone set connected by wire at an office is generally conducted via radio base stations 2, 3 and 4 and a mobile telephone switching office 1. The office 1 is connected to ordinary telephone lines as well as to radio base stations 2, 3 and 4 by signal lines 50, 51 and 52. These base stations 2, 3 and 4 are each allocated to predetermined service zones 56, 57 and 58 for paging to, answering to and relaying a call of an automobile telephone terminal (hereinafter referred as mobile terminal) in radio which is moving within the zone. The base stations 2, 3 and 4 are provided with antennas 53, 54 and 55 for the purpose. Although the FIG. 1 shows only the representative base stations 2, 3 and 4, other radio base stations are installed respectively in every one of the zones which are arranged to cover the whole space without interstices therebetween, and are wired to the mobile telephone swithing office 1.

Figure 2:
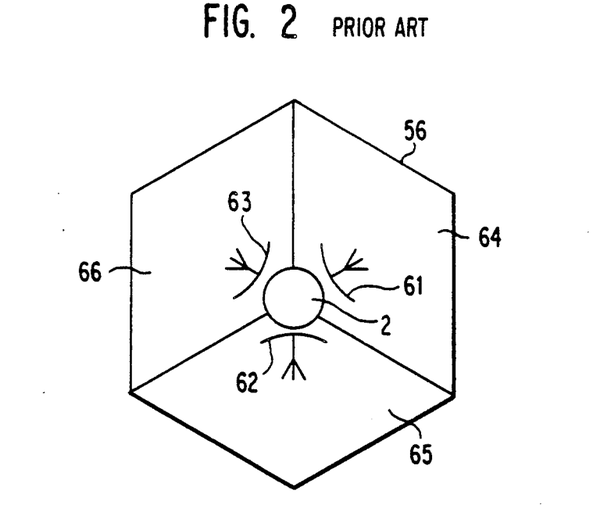
FIG. 2 is a view to show an example of the zone structure shown in FIG. 1 in more detail.

FIG. 2 shows the state where the base station 2 further sub-divides a zone for which the station is responsible for service into smaller zones for transmission/receiving of calls.

The antenna 53 of the base station 2 comprises three directional antennas 61, 62 and 63. Each of these antennas 61, 62 and 63 is responsible respectively for transmitting/receiving calls in each of the zones 64, 65 and 66 obtained by further dividing the circumference (360°) of the station 2 into three (120°).

The call from a mobile terminal 5 or to a mobile terminal 5 is conducted by paging, answering and speech via the office 1, and radio base stations 2 through 4. The radio base stations 2 through 4 respectively conduct paging and access between mobile terminals by utilizing such control channels as a bi-functional channel which is used for paging as well as for access and a mono-functional channel which is used for paging alone, and after radio connection is made, relay calls between the two telephone terminals by a speech channel designated by the switching office 1.

There is known a land mobile telephone system having two types of control channels. One of the control channels is a mono-functional channel for access dedicated to access such as calling or answering from a mobile terminal and ordering to the mobile terminal, and the other is bi-functional channel for paging and access used commonly for above-mentioned access and paging the mobile terminal. In this system, only the latter channel with the two functions can be used for paging by a radio base station to a mobile terminal, but both of the channels can be used for access between the mobile terminal and the base station. This system therefore is quite advantageous especially when the traffic in the upward direction or to the base station is heavy.

When the function of data receiving of the bi-functional channel of paging and access is disturbed by interference, jamming waves or circuit faults in such a conventional system, the channel cannot receive data, and both functions of receiving and transmitting have to be suspended.

When such a difficulty arises at a radio base station which is provided with the bi-functional channel but without the mono-functional channel, all the services have to be inconveniently suspended in the zone covered by the station. Further, even in the system having the bi-functional channels in a plural number in a service area, the quality of the land mobile telephone service is deteriorated by the degree equivalent to the suspended functions of one bi-functional channel. Moreover, if the bi-functional channels are installed in a larger number, it pushes up a cost.

As stated above, even in the system provided with two types of control channels, when it is broken, only the mono-functional channel can be used for service, incapacitating the function of paging the mobile terminal.

U.S. Pat. No. 4,434,506 discloses a radio communication system where one of the speech channels is switched to be used as a control channel when the control channel is broken. But the system naturally suffers a decrease in the number of speech channels in service.

SUMMARY OF THE INVENTION

An object of this invention is to obviate the problems encountered in the prior art and to provide a radio telephone system with switching control of control channels having two types of control channels one of which has only one function of access and the other of which has two functions of paging and access so as to enable continuing of service even when the receiving function is broken in the bi-functional control channel.

In order to achieve the aforementioned object, a radio telephone system with switching control of control channels according to the invention, said control channels for transmitting and receiving control information between plural mobile telephone terminals and a radio base station, comprising a mono-functional channel for access which is dedicated to access in transmission/receiving of data by calling from said terminals and answering from said terminals and ordering to said terminals, and a bi-functional channel for paging and access which is capable of paging one of said terminals as well as for said access is characterized in that:

said base station including fault detecting means for detecting a fault of data receiving function of said bi-functional channel, and channel control means for controlling said bi-functional channel when said detecting means detects said fault to use the bi-functional channel fixedly as a mono-functional channel for paging; and when said fault is occured, said mono-functional channel for paging is used only to transmit data for paging said terminals from said base station while said mono-functional channel for access is used to transmit/receive data related to actions other than paging to said terminals.

BRIEF DESCRIPTION OF THE DRAWINGS

Above and other objects and features of this invention will be more clearly understood when taken in conjunction with detailed description hereinbelow referring to attached drawings.

In the drawing, the same reference numerals denote the same structural elements.

DESCRIPTION OF THE PREFERRED EMBODIMENT

Figure 3:
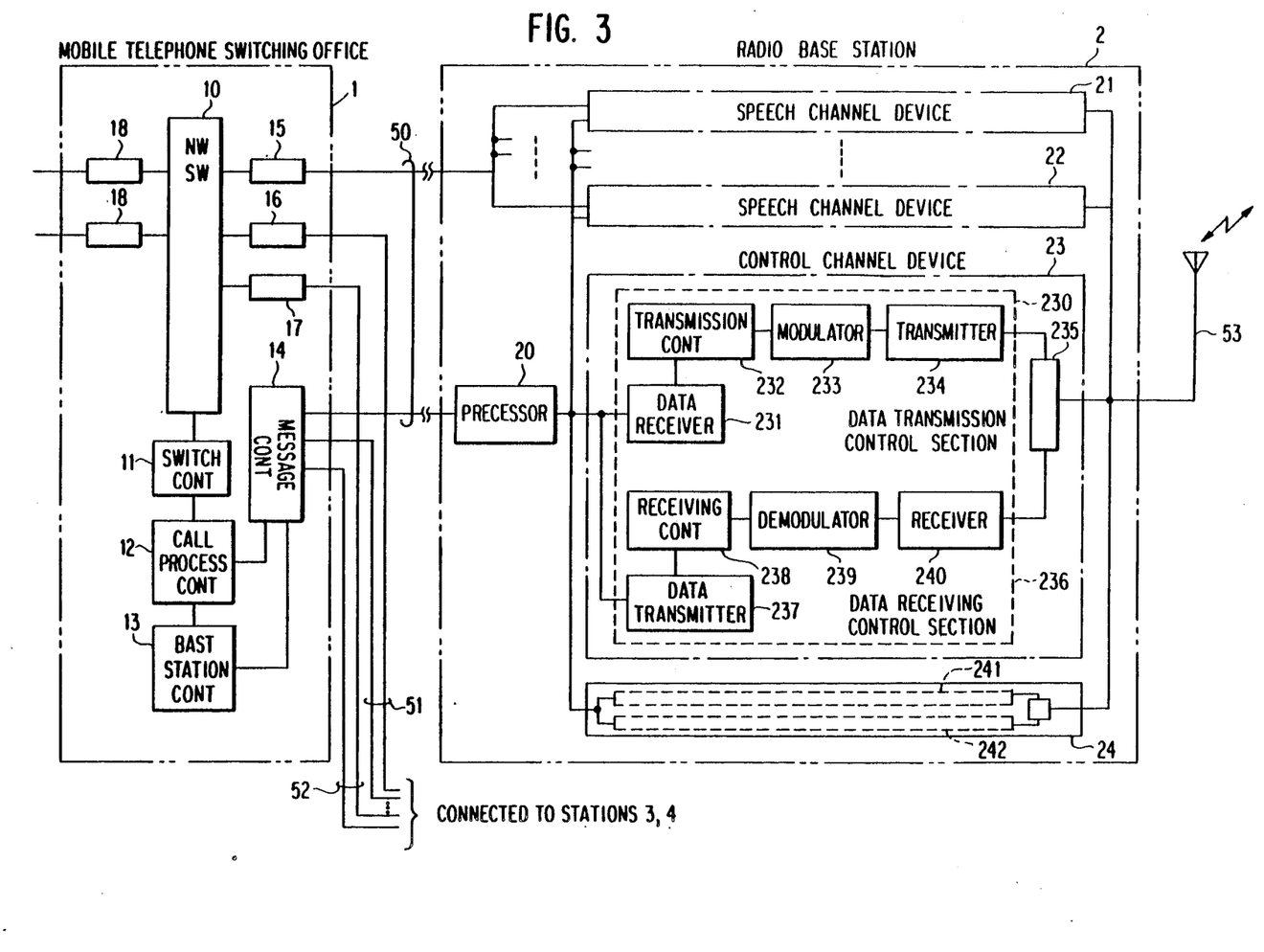
FIG. 3 is a block diagram to show an embodiment of this invention.

Referring to FIG. 3, an embodiment of this invention includes a switching office 1 comprising a network switch 10, trunks 15 through 18 connected the switch 10, a switch controller 11 for controlling the switch 10, a call process controller 12, a base station controller 13 for controlling respective radio base stations 2 through 4, and a message transmission/receiving controller 14 for transmitting/receiving information on the call process and on the base station control to and from the radio base stations 2 through 4. The trunk 18 is connected to public telephone networks. The trunk 15 is connected to a speech line of a radio base station 2. Trunks 16, 17 are respectively connected to other radio base stations 3, 4.

As the radio base stations 2, 3 and 4 have the same structure, description will be given only in respect of the station 2. The base station 2 includes a main processor 20 connected to the message transmission/receiving controller 14 by a control information line, plural speech channel devices 21 through 22 connected to the trunk 15 by a speech line, two control channel devices 23, 24, and an antenna 53. The control channel devices 23, 24 and speech channel devices 21 through 22 are connected to the main processor 20 for control by data lines as well as to the antenna 53 by signal lines.

As the control channel devices 23, 24 have the same structure, the channel device 23 will be discussed for detailed description. The device 23 functions herein as a bi-functional channel for paging as well as for access, and includes a data transmission control section 230, a data receiving control section 236 and a circuit 235 used for both receiving and transmission. The data transmission control section 230 includes a control data receiver 231 which is connected to the main processor 20 and receives control data from the processor 20, a data transmission controller 232 which outputs control data to the mobile terminal 5 in a predetermined data format which will be described hereinafter, a modulator 233 which modulates the control data, and a transmitter 234. The data receiving control section 236 includes a receiver 240 which receives the data received through the antenna 53 via the circuit 235, a demodulator 239 which demodulates received data, a data receiving controller 238 which judges received data after demodulation, and a control data transmitter 237 which informs the information based on the received data to the main processor 20. The control channel device 23 functions as the bi-functional channel (i.e., a paging channel and an access channel) wherein the data transmission control section 230 transmits at a frequency of $T_1$ while the data receiving control section 236 receives at a frequency of $R_1$. The channel 24 functions as a mono-functional channel (i.e., an access channel only) wherein the data transmission control section 241 transmits at the frequency of $T_2$ while the data receiving control section 242 receives at the frequency of $R_2$.

Figure 4:
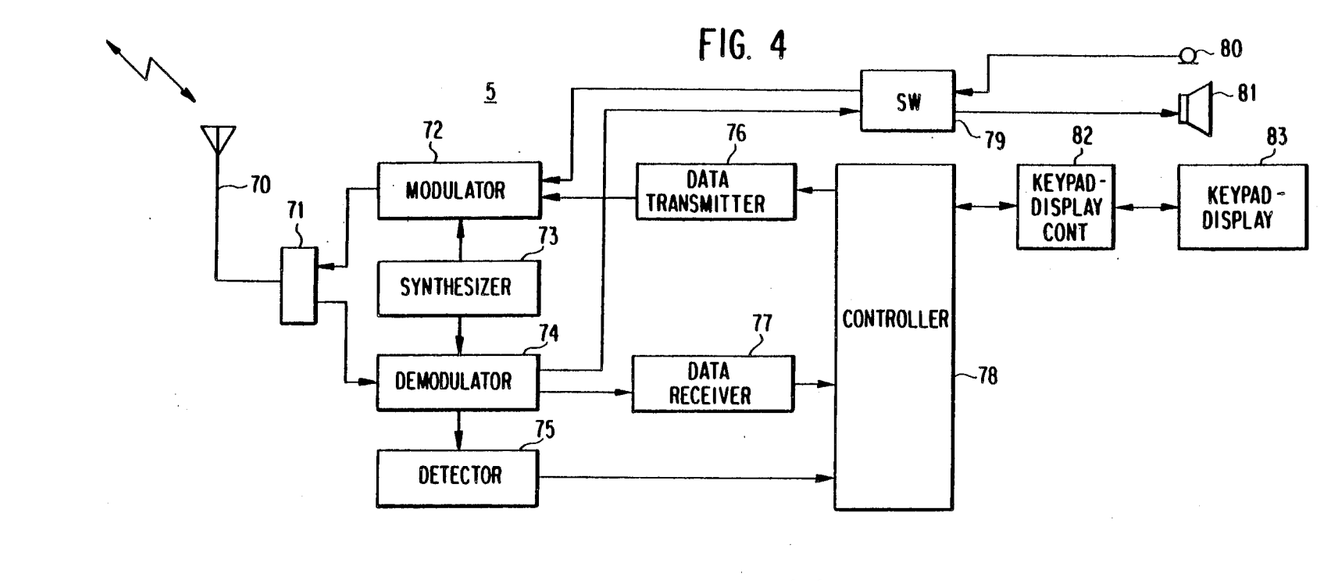
FIG. 4 is a block diagram to show an embodiment of a mobile terminal.

FIG. 4 shows the mobile terminal 5 in detail. The mobile terminal 5 comprises an antenna 70, a circuit 71 used in transmission/receiving, a demodulator 74 which demodulates received waves, a data receiver 77 which receives control data from the demodulated waves, a detector 75 which detects presence/absence of received radio waves, a controller 78 which controls the mobile terminal as a whole, a transmission modulator 72 which modulates control data as well as speech signals to be transmitted and which transmits the data and the signals from the antenna 70 via the circuit 71, a data transmitter 76 which formulates control data to be transmitted to the radio base station and outputs the data to the modulator 72, a synthesizer 73 which changes frequencies of the modulator 72 and the demodulator 74 based on the instruction from the controller 78, a switch 79 which switches on or off the speech signal lines connected to the modulator 72 and the demodulator 74 with a microphone 80 and a speaker 81 respectively upon instruction from the controller 78, a keypad/display 83, and keypad/display controller 82.

This embodiment is a system in accordance with EIA (Electronic Industries Association) specifications, and control data from radio base stations 2 through 4 to respective mobile terminals 5 are transmitted by OHM (System Parameter Overhead Message) in accordance with CIS-3-A or CIS-3-D of EIA. The OHM is inputted into the controller 78 via the antenna 70, the circuit 71, the demodulator 74, and the data receiver 77 to control respective units.

Figure 5A:
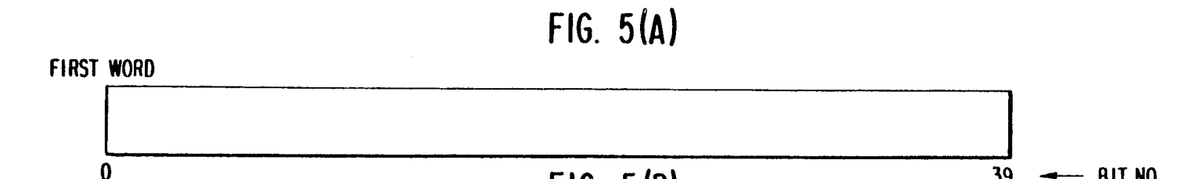
FIG. 5A and 5B is a view to show an example of a message transmitted from a radio base station to a mobile terminal.
Figure 5B:
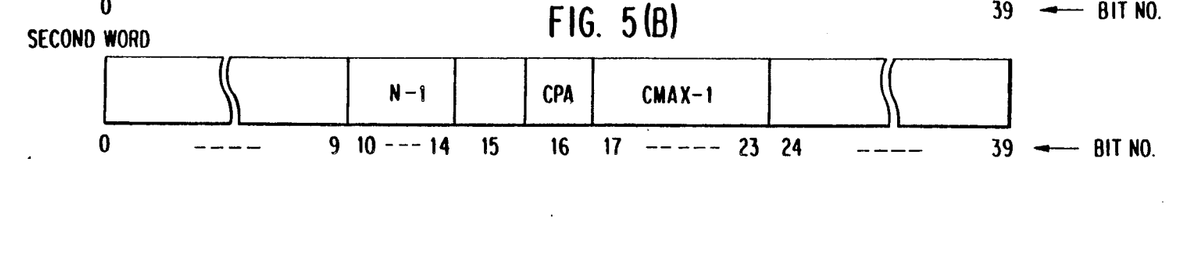

In the first word (40 bits) and the second word (40 bits) which are to be transmitted as said OHM, as shown in FIG. 5, five bits from the tenth through the 14th bits in the second word represent information "N−1" concerning the number of the paging channels, the 16th bit represents the information "CPA" concerning the structure of the control channels, and seven bits from the 17th through 23rd bits represent "CMAX-1" concerning the number of access channels. (Description will only be given to the information directly related to this invention.) More specifically, when CPA=1, it indicates the normal state of this embodiment system provided with the bi-functional channel. When CPA=0, it indicates a fault in the system and the paging channel is separated from the access channel. "N" indicates the number of paging channels in the system, "N−1" indicates the number of the paging channels counting from the channel defined as the leading paging channel. "CMAX" indicates the number of access channels in the system while "CMAX-1" indicates the number of the access channels counting from the channel defined as the leading access channel. To facilitate understanding, the leading paging channel KO is assumed to be the 301st channel, the leading access channel to be K4, N=10, CMAX=20, the mono-functional channel for access and the bi-functional channel in the service area 56 to be respectively K1 and K2. Different frequencies are used in adjacent service areas as the control channels.

Description will now be given to the actions to be taken when a fault takes place in the system with the structure mentioned above.

In FIG. 3, the control channel device 23 functions as the bi-functional channel of paging and access at transmission frequency $T_1$ and receiving frequency $R_1$ as described above. The control channel device 24 on the other hand, functions as the mono-functional channel of access with transmission frequency $T_2$ and receiving frequency $R_2$. When it pages the mobile terminal 5, the channel device 23 uses only the transmission frequency $T_1$.

Figure 6A:
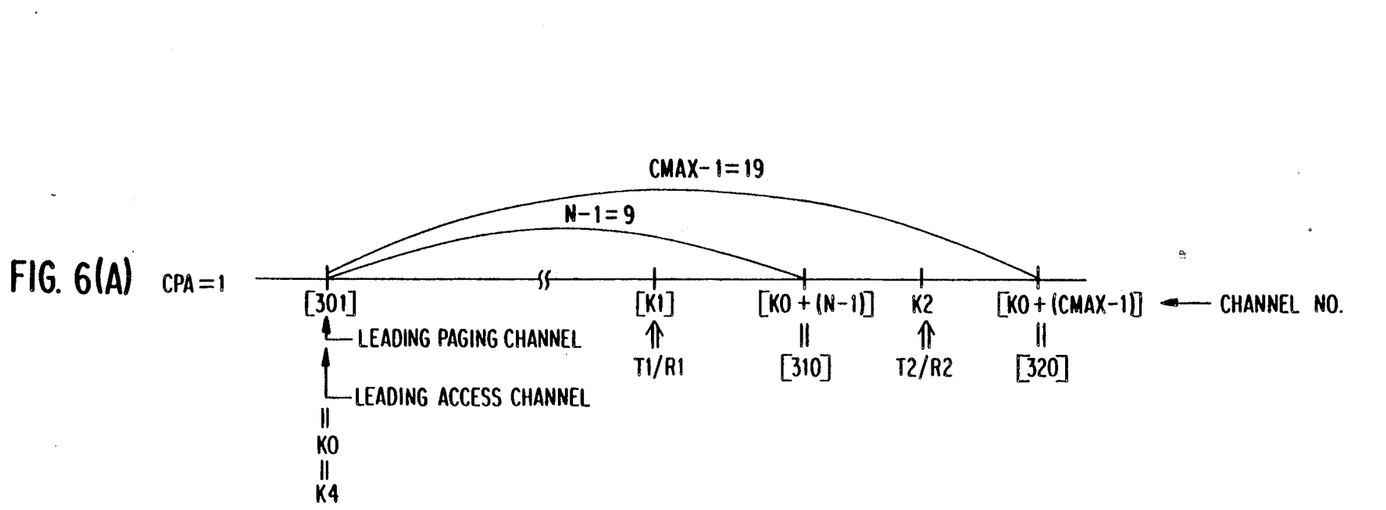
FIG. 6A and 6B is a view to show an arrangement of control channels both at normal time and at the time when a fault occurs.

While the functions of transmission/receiving of the channel device 23 are normal, relation holds as CPA=1 at the OHM (FIG. 5). The mobile terminal 5 recognizes when it receives the OHM, that the control channels of the number of "N−1" counting from the predetermined leading paging channel KO are usable as the paging channels, and the control channels of the number of "CMAX-1" counting from the leading access channel K4 are usable as the access channels. Channels are set once in every several hertz. Therefore, the frequencies $T_1$, $R_1$, $T_2$, $R_2$ are positioned as shown in FIG. 6(A) respectively. When any mobile terminal is required to use a paging channel or an access channel, it scans channels of the predetermined range, detects a control channel in the area where the terminal exists, and uses the detected channel. In the example, as the leading paging channel KO and the leading access channel K4 are the 301st channel, channels from the 301st to the 310th channels (i.e., KO+(N−1)=301+(10−1)=310) are usable as paging channels, and the channels from the 301st to the 320th channels (i.e., KO+(CMAX−1)=301+(20−1)=320) are usable as access channels. In other words, the channels from the 301st to the 310th are bi-functional channels of paging and access while the channels from the 311th to 320th channels are monofunctional channels of access only.

When jamming waves occur at the frequency $R_1$, the system will process it in the following manner. The process will be explained referring to FIGs. 7 and 8. When the data receiving controller 238 of the channel device 23 recognizes the receipt of a carrier (Step S1), it examines presence/absence of received data (Step S2). When it does not receive data even though it has received a carrier for a predetermined time (Step S3), it judges that the normal function has been disturbed by jamming waves, and reports it to the main processor 20 via the control data transmitter 237 (Steps S4 and S5). The Step S4 is provided as a measure to avoid repetition of reporting the same disturbance to the processor 20.

Figure 6B:
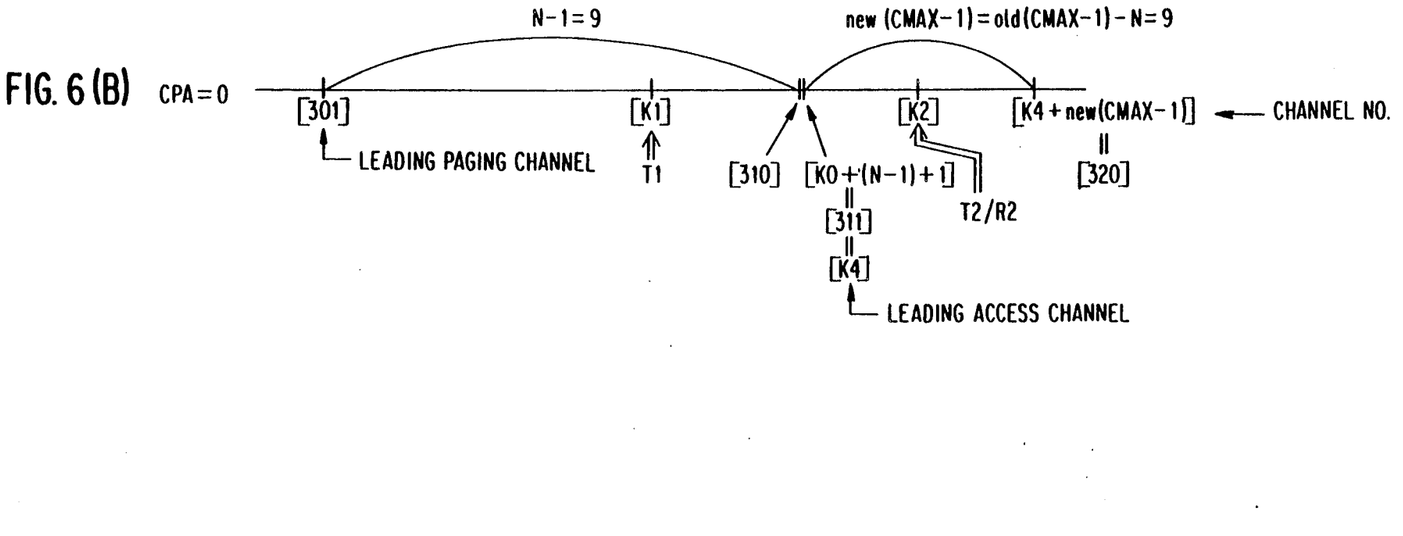

When the fault is reported, the main processor 20 processes it as follows. The process will be explained by referring to FIG. 8. When the processor 20 receives a message from the channel device 23, it judges whether or not it relates to the fault (Step S11), and if the message indicates an occurrence of the fault (Step S12), it recognizes that a fault takes place in the data receiving function of the bi-functional channel. The channel cannot function as the access channel for data transmission/receiving because there exist jamming waves on the receiving frequency $R_1$. But as the transmission function of the data transmission control section 230 is normal, it can use the transmission frequency $T_1$ to page a mobile terminal 5. The processor 20 therefore suspends the actions of the data receiving control section 236, and shifts the channel device 23 from the actions of the bi-functional channel with frequencies $T_1$ and $R_1$ for paging and access to the actions of monofunctional channel with the frequency of $T_1$ for paging alone (Steps S13 through S15). More particularly, it switches the structure of the control channels at the radio base station 2 from the structure with the bifunctional channel and the mono-functional channel to the structure with a paging only channel ($T_1$) and access only channel ($T_2$, $R_2$). The processor 20 changes the values of CPA and CMAX-1 in order to inform such changes in the structure to the mobile terminals via OHM, and informs the same to the data transmission controller 232. Referring to FIG. 6(B), the processing steps (Steps S14 and S15) will be described below in more detail. "0" is set first at CPA, and as the range of usable channels by the mobile terminal 5 changes, the value of the new "CMAX-1" is set at the value obtained by subtracting N from the old "CMAX-1". The terminal 5 is informed of the new value of OHM through the channel device 23 which has been newly designated as the mono-functional channel of paging. Specifically, the new "CMAX-1" becomes 19−10=9. When it receives the OHM, the controller 78 of the mobile terminal 5 learns the change in the structure where the paging channel is separated from the access channel because CPA=0. As a result, the terminal 5 recognizes that the range of the mono-functional paging channels is unchanged or is from the 301st channel to the 310th channel, but the range of mono-functional access channels is newly designated as the range from the 311th channel or the channel immediately after the last paging channel (the 310th) (i.e., K4=KO+(N−1)+1=301+(10−1)+1=311) to the 320th channel (i.e., K4+new "CMAX-1"=311+9=320). In the service zone 56 covered by the base station 2, the service is continued with this control channel structure. More particularly, when a call is to be made to the mobile terminal 5, for instance, paging is made via the mono-functional channel of paging ($T_1$), and the called terminal responses it by using the mono-functional channel ($T_2$/$R_2$) of access to transmit/receive the control data for the call. When the mobile terminal 5 initiates a call, it transmits calling signals by using the mono-functional channel of access ($T_2/R_2$) alone. The main processor 20 of the base station 2 reports to the base station controller 13 the fact that the control channel structure has been shifted to a new one due to the occurrence of a fault via signal line 50 and message transmission/receiving controller 14.

Figure 7:
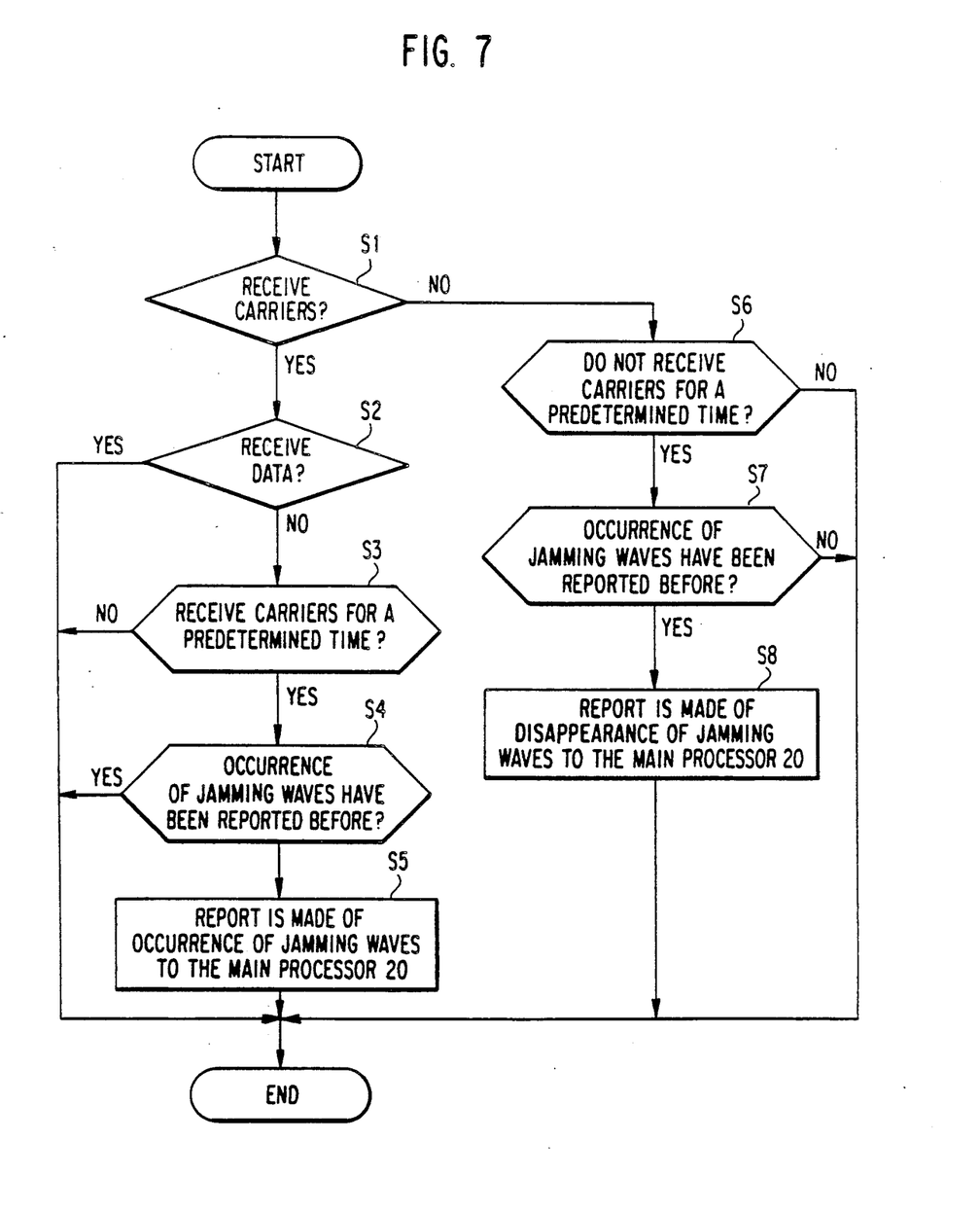
FIG. 7 is a flow chart to explain actions of a control channel device at the radio base station.
Figure 8:
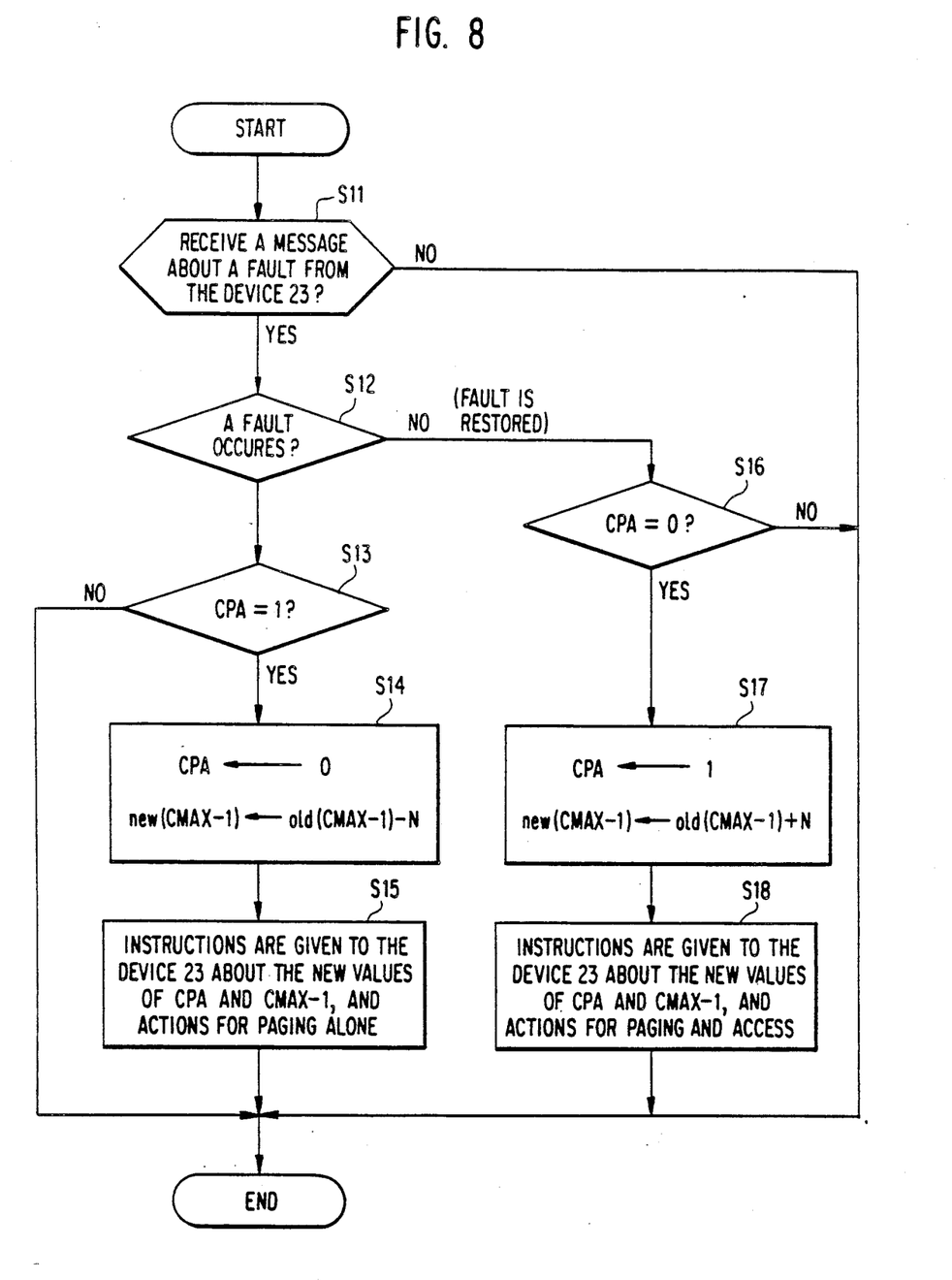
FIG. 8 is a flow chart to explain actions of a processor at the radio base station.

Referring to FIGS. 7 and 8, the actions when the normal state of the system is restored will be described. When the data receiving controller 238 do not receive carriers for a predetermined period of time after it stopped receiving carriers of jamming waves (Steps S1 and S6), it judges that the jamming waves have disappeared and the normal state of the system has been restored, and reports the recovery to the main processor 20 (Steps S7, S8).

When receiving the report of recovery (Steps S11, S12), the main processor 20 returns the values of CPA and CMAX-1 of the OHM to the original values in order to shift the structure of the control channels to the original structure of the mono-functional paging channel and the bi-functional paging and access channel, and conducts the necessary steps to transmit it to the mobile terminal 5 (Steps S16 through S18).

Above description was made by referring to a radio base station 2 alone, but a similar switching control may be made to other radio base stations respectively.

Although a fault due to jamming waves alone was described in relation to FIG. 7, if a fault is caused in devices, such other measures may be taken that the main processor 20 periodically inspects the state of data receiving control section 236 or that the data receiving controller 238 detects irregularities at the receiver 240 or the demodulator 239, and reports the occurrence of the fault to the main processor 20 thereby realizing this invention.

What is claimed is:

1. A radio telephone switching control system having control channels which transmit/receive control data between a plurality of movable terminals and a radio base station, said control channels comprising a mono-functional channel for access which is dedicated to access in transmission/receiving of data by calling from said terminals, and a bi-functional channel for paging and access usable as a channel for paging one of said terminals as well as for said access;

said base station including fault detecting means for detecting a fault of data receiving function of said bi-functional channel, and channel control means for controlling said bi-functional channel to use this channel fixedly as a mono-functional channel for paging when said detecting means detects said fault;

wherein only one kind of control channel information relating to a first range of a channel usable for said access and a second range of a channel usable for said paging is broadcast in the same service zone corresponding to one radio base station, all of said movable stations existing in same service zone scanning the first range or the second range to decide the channel for said access or the channel for said paging according to said received control channel information;

means for setting said mono-functional channel for access and said bi-functional channel for paging and access, when the fault detecting means does not detect the fault, by overlapping all of said second range with a part of said first range;

means for separating said second range from said first range, when the fault detecting means detect the fault, whereby said mono-functional channel for paging is used only to transmit data for paging said terminals from said base station while said mono-functional channel for access is used to transmit/receive data related to actions other than paging to said terminals.

2. A radio telephone switching control system as claimed in claim 1, wherein when said detecting means detects restoration from said fault, said channel control means returns said mono-functional channel for paging into said bi-functional channel for paging and access, and informs said terminals of the switching of the control channel structure due to the restoration from said fault.

3. A radio telephone switching control system as claimed in claim 1 wherein said information given to said terminals is conducted by a system parameter overhead message.

* * * * *